UNITED STATES PATENT OFFICE.

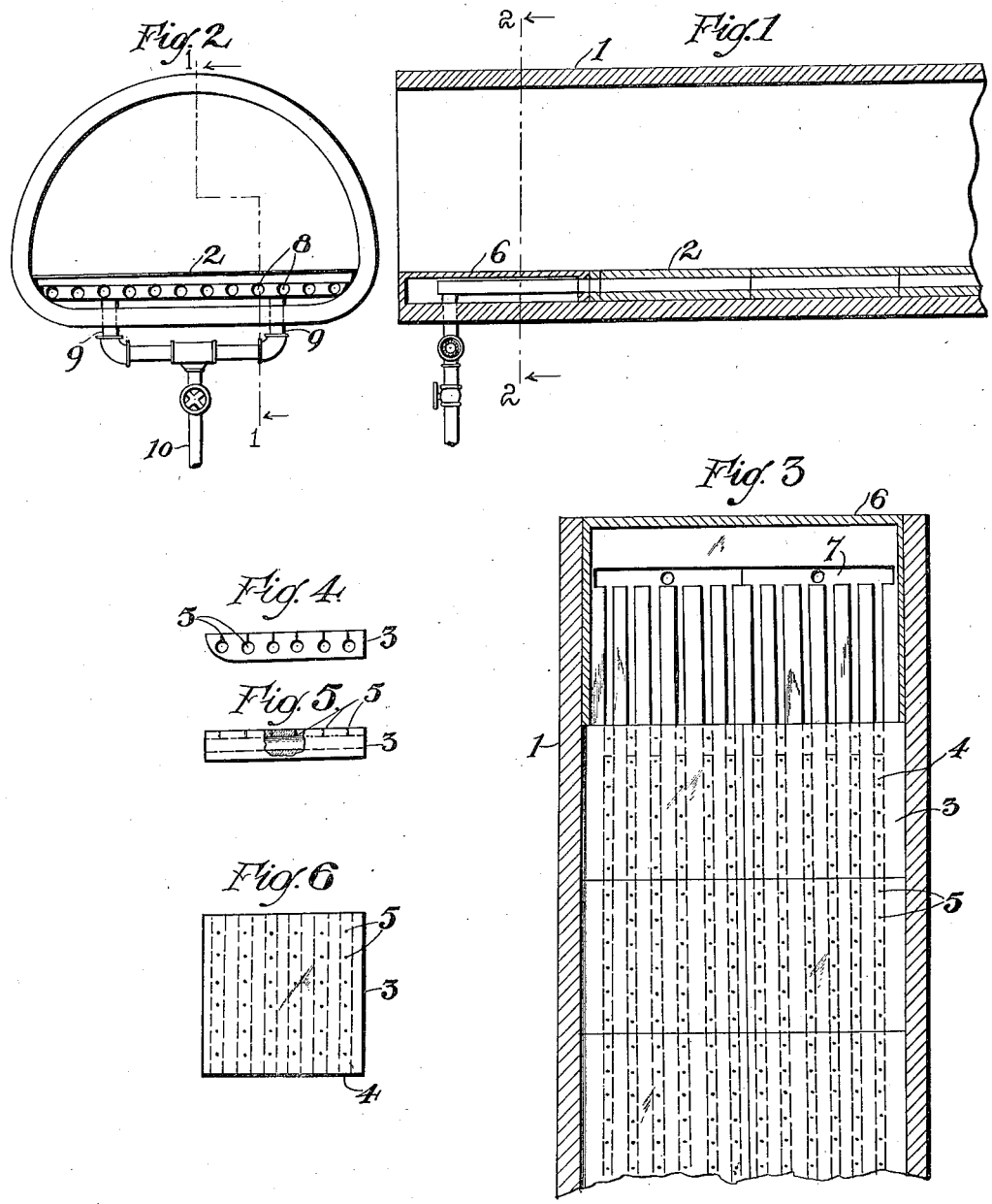
T. L. WHEELER.
APPARATUS FOR MAKING ACTIVE CHARCOAL.
APPLICATION FILED MAY 20, 1919.
1,413,146. Patented Apr. 18, 1922.

THORNE L. WHEELER, OF NEW YORK, N. Y.

APPARATUS FOR MAKING ACTIVE CHARCOAL.

1,413,146. Specification of Letters Patent. Patented Apr. 18, 1922.

Application filed May 20, 1919. Serial No. 298,380½.

*To all whom it may concern:*

Be it known that I, THORNE L. WHEELER, a citizen of the United States, and residing at New York city, N. Y., have invented a new and useful Apparatus for Making Active Charcoal, of which the following is a specification.

The present invention relates to apparatus for making active charcoal by dry distillation of organic material and the activation of the resulting charcoal.

Heretofore, activated charcoal has usually been made by first preparing a suitable charcoal and after cooling and comminuting to the proper size introducing this material into some form of apparatus wherein the charcoal may be heated to a suitable temperature in the presence of steam.

This method involves the use of two or more forms of retort and involves unnecessary handling of the material, time and fuel.

The present invention is therefore devised to overcome these and other objects not mentioned and has among its objects the production of an apparatus wherein the carbonization and activation steps may both be carried out without any intermediate operations and with less expenditure of time and fuel.

In my application, Serial No. 298,380, filed May 20, 1919, for the manufacture of activated charcoal, there is described a process wherein raw material is carbonized and activated in a single operation.

In carrying out the process of that application some difficulty was encountered due to the inability of materials used to withstand the high temperatures and due to clogging of the steam inlets. Accordingly, the present apparatus was designed to overcome difficulties of this sort and provide a retort which may be used for many other processes as well as the activation of charcoal.

The present invention, therefore, relates more specifically to a retort which is suitable for use in high temperature operations and which is simple in construction, very readily repaired and efficient in operation. It comprises in the preferred form a tubular retort having the under side flattened and provided with a false bottom made up of firebrick of a special type which latter are provided with channels having perforations leading therefrom to one face of the brick.

The invention will be more readily described and understood by referring to the accompanying drawing in which:

Fig. 1 is a longitudinal vertical section of a retort constructed according to the present invention along the line A—A of Fig. 2.

Fig. 2 is a vertical cross-section of such a retort along the line B—B of Fig. 1.

Fig. 3 is a horizontal section of a retort with parts in section showing the arrangement of the steam supply header and tubes.

Fig. 4 is a perspective view of the edge of one of the firebrick.

Fig. 5 is a similar view of another edge.

Fig. 6 shows the top of one of the brick.

In the drawings the retort represented by the numeral 1 is provided with a floor 2 made of firebrick 3 of a special form.

These firebrick are shaped in conformity with the shape of the flattened side of the retort and as shown in Figs. 4, 5, and 6, are provided with longitudinal channels 4 therein. One face of the brick is provided with small perforations 5 extending to the channels therein as clearly indicated in Fig. 6. Further, the brick are so constructed that when properly placed on the floor of the retort, the channels therethrough form with the channels in adjacent brick, continuous, longitudinal, perforated tubes within the false bottom of the retort.

Instead of the firebrick at one end of the retort, there is used a hollow member 6 and within this is placed a steam supply header 7 having connected therewith pipes 8 leading from the header to the ends of the several channels 4 in the first row of the brick. This header is connected by means of pipes 9 and suitable pipe connections to the valved pipe 10 leading from a source of steam supply. The ends of the retort are closed by suitable means such as are commonly used in the art and not shown in the drawings.

Having now described my invention and the preferred form of the same, I claim:

1. Apparatus for making active charcoal comprising a retort having therein a false bottom composed of firebrick, said firebrick being provided with tubular channels therethrough adapted to form, when in place, continuous, longitudinal, tubes within the false bottom, one face of the brick having perforations extending to said channels for allowing communication between the channels and the interior of the retort.

2. Apparatus for making active charcoal comprising a retort having therein a false bottom composed of firebrick, said firebrick being provided with tubular channels therethrough adapted to form, when in place, continuous, longitudinal tubes within the false bottom, one face of the brick having perforations extending to said channels for allowing communication between the channels and the interior of the retort, and means for supplying a reactive gas or vapor to the tubes.

3. Apparatus for making active charcoal comprising a retort having therein a false bottom composed of refractory material, said refractory material being provided with tubular channels therethrough adapted to form, when in place, continuous, longitudinal, tubes within the false bottom, one face of the refractory material having perforations extending to said channels for allowing communication between the channels and the interior of the retort.

4. Apparatus for making active charcoal comprising a retort having therein a false bottom composed of refractory material, said refractory material being provided with tubular channels therethrough adapted to form, when in place, continuous, longitudinal, tubes within the false bottom, one face of the refractory material having perforations extending to said channels for allowing communication between the channels and the interior of the retort, and means for supplying a reactive gas or vapor to the tubes.

THORNE L. WHEELER.